United States Patent [19]

Redden

[11] 4,393,485
[45] Jul. 12, 1983

[54] APPARATUS FOR COMPILING AND MONITORING SUBTERRANEAN WELL-TEST DATA

[75] Inventor: Raymond L. Redden, Sacramento, Calif.

[73] Assignee: Baker International Corporation, Orange, Calif.

[21] Appl. No.: 146,734

[22] Filed: May 2, 1980

[51] Int. Cl.³ .......................... G01V 1/40; G01V 1/22
[52] U.S. Cl. ......................................... 367/25; 367/86; 73/151; 73/152; 175/40; 175/50
[58] Field of Search .................. 364/422; 367/86, 25; 340/861, 857; 73/152, 151, 151.5; 175/40, 48, 50; 166/250

[56] References Cited

U.S. PATENT DOCUMENTS

| | | | |
|---|---|---|---|
| 3,908,761 | 9/1975 | Patterson et al. | 166/250 |
| 3,916,684 | 11/1975 | Rundell | 73/151.5 |
| 3,971,926 | 7/1976 | Gau et al. | 175/50 |
| 3,991,611 | 11/1976 | Marshall et al. | 364/422 |
| 4,157,659 | 6/1979 | Murdock | 364/422 |
| 4,195,349 | 3/1980 | Balkanli | 364/422 |
| 4,216,536 | 8/1980 | More | 367/25 |
| 4,267,885 | 5/1981 | Sanderford | 166/250 |

Primary Examiner—Nelson Moskowitz
Attorney, Agent, or Firm—William C. Norvell, Jr.

[57] ABSTRACT

An apparatus for monitoring the testing of a subterranean well by acquiring data from the well includes means for monitoring transducers positioned downhole, at the wellhead, at a separator or at other locations to obtain the values for a predetermined set of operating characteristics. The apparatus includes a microcomputer for calculating additional characteristics utilizing one or more of the transducer values and a visual display for onsite viewing of the values for the monitored and calculated characteristics. The apparatus further includes a printer and a tape recorder. The microcomputer controls the recording intervals of the printer and the tape recorder for recording the monitored and calculated values of the characteristics on a continuous basis. The values of the characteristics represent current production information for the well. The apparatus also includes means for monitoring the transducer power supply voltage and the microcomputer power supply voltage. If the microcomputer power supply fails, a backup battery is automatically connected to power a storage means for preserving the values of the operating characteristics for a predetermined time.

28 Claims, 4 Drawing Figures

APPARATUS FOR COMPILING AND MONITORING SUBTERRANEAN WELL-TEST DATA

BACKGROUND OF THE INVENTION

1. FIELD OF THE INVENTION

The invention relates in general to an apparatus for monitoring data from a subterranen well to provide current production information.

2. DESCRIPTION OF THE PRIOR ART

In order to determine production characteristics from a subterranean well, it is necessary to know the values of various temperature and pressure parameters. These parameters have been monitored by positioning transducers at selected points downhole, at the wellhead, at the fluid separator, and the like. Previously, the values of these characteristics were recorded by hand at the well site and utilized, along with hand calculations of additional characteristics, to determine the condition and production capability of the well. Such a method is subject to human error and delay and decreased reliability of the information. Some improvement in the quality of the information has been achieved by recording the characteristics values on strip chart recorders.

SUMMARY OF THE INVENTION

The present invention relates to an automatic test monitoring system for a subterranean well. Pressure and temperature transducers are positioned at selected locations and are connected to filter circuits for generating signals respresenting the values of the well operating characteristics. The filter circuits supply the characteristic signals to a data acquisition system which includes a microcomputer control, keyboard and display.

The keyboard is utilized to manually enter characteristic values for start-up and test purposes, in the desired format for reporting characteristic values. The microcomputer directs the monitoring of the characteristics, performs selected calculations to generate additional characteristic values, and controls the output of the monitored and calculated characteristic values to a record/print system. The microcomputer memory is protected against power failure by an input voltage monitoring circuit which automatically switches to battery power when the primary power source is interrupted. Although no new data is acquired, the stored data is saved.

The output signals from the data acquisition system are inputs to a record/print system. This system includes a tape recorder for recording all of the received characteristic values and a printer for recording operator selected ones of the characteristic values. The printer format and print intervals are selected through the keyboard in the data acquisition system. The record/print system includes a microcomputer which receives the instructions from the data acqustion system and controls the tape recorder and printer. This microcomputer is also responsive to a power failure for saving stored data.

An edit system reads the tapes produced by the record/print system and permits an operator to edit the data, re-record the data and print selected reports. Operator commands are entered through a keyboard into a microcomputer. The microcomputer reads the original tape and produces a print-out on a printer. The operator reviews the print-out and enters revisions through the keyboard. The microcomputer responds by recording the revised and unchanged original data on a new tape. The data on the new tape can also be printed and or sent to a remote computer over a telephone line.

DESCRIPTION OF THE PREFERRED EMBODIMENTS

Figure 1:
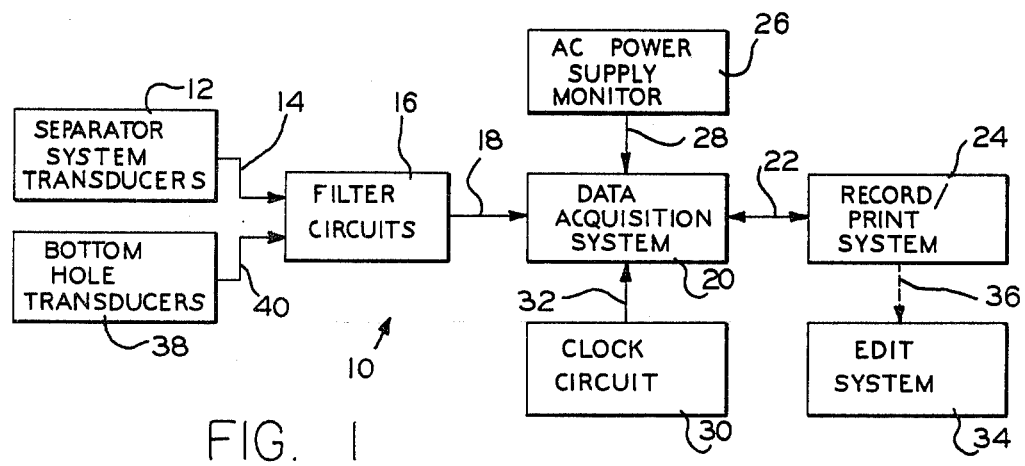
FIG. 1 is a block diagram of an automatic test data system according to the present invention for monitoring both a separator system and bottom hole operating characteristics for a subterranean well.

There is shown in FIG. 1 an automatic test system 10 for monitoring a predetermined set of operating characteristics associated with subterranean wells. The system automatically monitors and compiles data and performs calculations which enable an operator to evaluate the performance of the well.

Typically, the majority of the characteristics sensed by the system are associated with the separator system of the well. The system includes a plurality of separator system transducers 12 which generate signals on lines 14, each signal representing one of the characteristics to be monitored. The following table (Table 1) is an example of several separation system characteristics which can be monitored, along with the model number and manufacturer of a suitable transducer which can be used for monitoring the particular characteristic.

TABLE 1
LIST OF MEASURED CHARACTERISTICS AND TRANSDUCERS

| Characteristic | Transducer (Manufacturer) |
| --- | --- |
| (1) Wellhead pressure | Model 753-1 Gage Pressure Electronic Transmitter (ITT Barton, 900 S. Turnbull, Canyon Rd., City of Industry, California 91749) |
| (2) Wellhead temperature | Model 393 Electronic Temperature Transmitter (ITT Barton) |
| (3) Gas temperature | Model 393 Electronic Temperature Transmitter (ITT Barton) |
| (4) Oil temperature | Model 393 Electronic Temperature Transmitter (ITT Barton) |
| (5) Gas differential pressure | Model 752-1 Differential Electronic Pressure Transmitter (ITT Barton) |
| (6) Static separator pressure | Model 753-1 Gage Pressure Electronic Transmitter (ITT Barton) |
| (7) Oil flow | Model PLZC-2A1S-2E6C 2" ANSI 600 Ball Vortex Flowmeter (Ball Manufacturing, 903 W. Center, North Salt Lake, Utah 84054) |
| (8) Water flow | Model PLZC-2A1S-2E6C 2" ANSI 600 Ball Vortex Flowmeter (Ball Manufacturing) |

The signals on the lines 14 are supplied to a plurality of filter circuits 16. The circuits 16 filter the transducer signals and generate output signals to a data acquisition system (DAS) 20 on lines 18. The DAS 20 transmits the data on lines 22 to a record/print system 24 where the data is recorded on a suitable storage device such as a magnetic tape. The DAS 20 also performs calculations on the incoming data to generate the values of addtional operating characteristics which assist the operator in evaluating the performance of the well. Examples of calculations which can be performed by the DAS 20 include the gas flow rate, total gas produced, total oil produced, total water produced, and the gas/oil ratio.

An AC power supply monitor 26 senses the AC power to the system 10 and generates power failure warning signals on lines 28 to the DAS 20 when the AC power falls below a suitable operating voltage. As will be discussed, the warning signals alert the DAS 20 to store all the pertinent data in a memory circuit having its own backup battery.

A clock circuit 30 generates a real time signal on lines 32 to the DAS 20 which utilizes the signal to perform such calculations as flow rate and per day outputs. As will be discussed, the circuit 30 includes backup battery for maintaining the realtime signal in the event of a system power failure.

After the data and calculations have been recorded on a storage device, the storage device can be manually transferred to an edit system 34 where an operator can examine the data, revise the data, and add comments. This manual transfer of the storage device is represented by a dashed line 36.

In addition to monitoring a plurality of separation system characteristics, the automatic test system 10 can also monitor bottom hole characteristics, such as bottom hole temperature and bottom hole pressure. A plurality of downhole or bottom hole transducers 38 generate signals on lines 40, each representing one of the bottom hole parameters being measured. The filter circuits 16 then condition the signals before transmitting them to the DAS 20. Monitoring both wellhead and bottom hole parameters permit the DAS 20 to perform a reservoir evaluation on the well by determining the pressure and temperature gradients of the well. Also, the bottom hole transducers can further signal the condition of the well by shutting off the well and measuring the length of time necessary for the well to build up to a maximum static pressure.

Figure 2A:
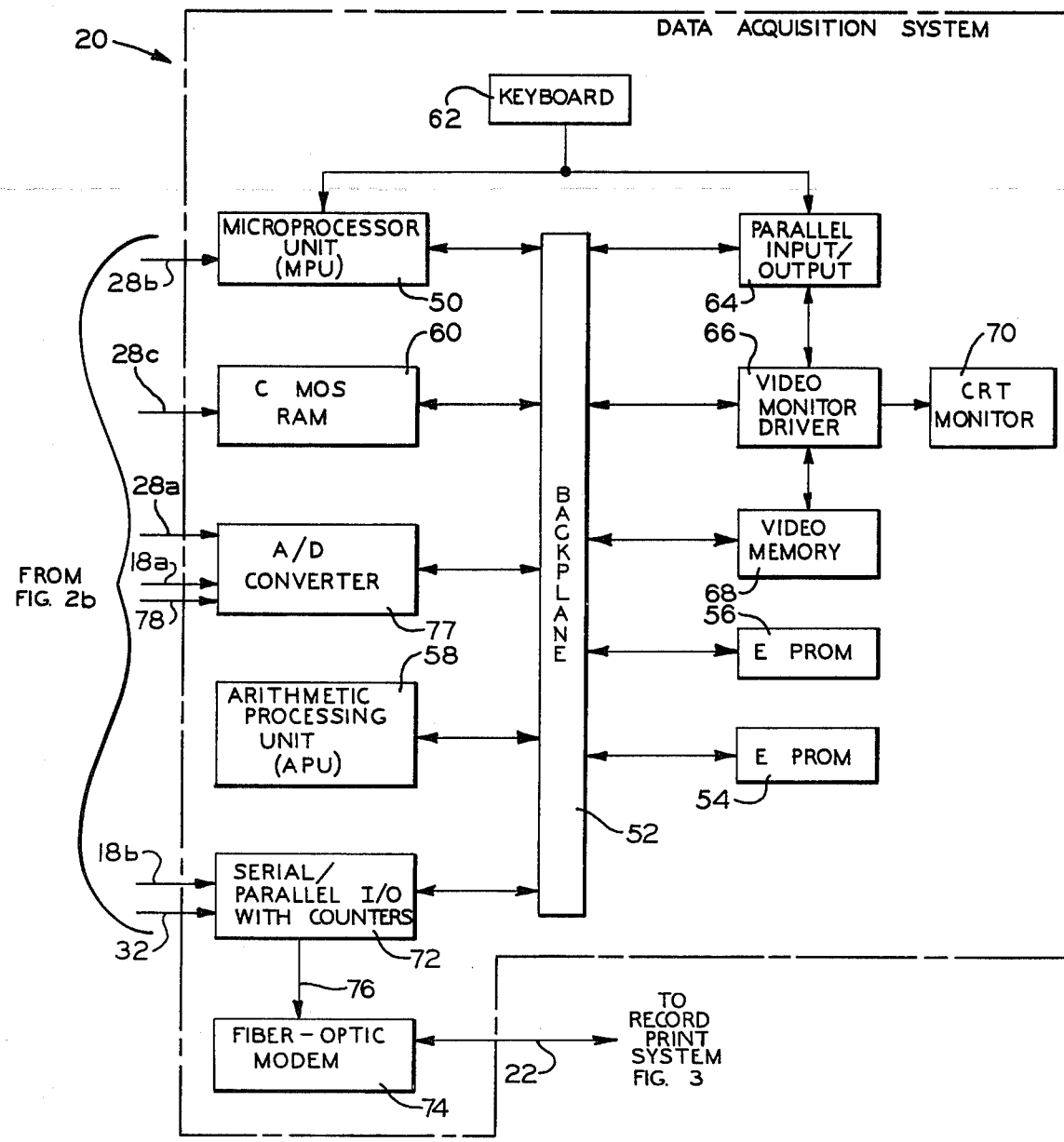
FIG. 2a is a block diagram of the data acquisition system of FIG. 1.

There is shown in FIG. 2a a simplified block diagram of the data acquisition system 20. The data acquisition system 20 includes a microprocessors unit (MPU) 50 for controlling the communication of the DAS 20 with the other components of the system 10. The MPU 50 communicates with the other DAS 20 components by means of a backplane 52. The backplane 52 provides connections between the various components of the DAS 20 with lines carrying control signals, address and data busses, and the required power and ground lines. The instructions for controlling the operations of the MPU 50 are stored in a pair of eraseable programmable read-only memories (EPROM) 54 and 56 connected to the backplane 52.

An arithmetic processing unit (APU) 58 is connected to the backplane 52 and is utilized by the MPU 50 to perform arithmetic calculations. The APU 58 receives instructions and data from the MPU 50 via the backplane 52. When the calculations are completed, the MPU 50 will take the results from the APU 58 and transfer them to another location.

A CMOS random access memory (RAM) 60 is connected to the backplane 52 and is utilized to provided backup memory for the system in the event of a power failure. The CMOS RAM 60 is backed up by a rechargable battery (not shown) which has the capacity to hold data in the memory for several weeks after the main power has failed. The RAM 60 includes a trickle charge circuit (not shown) for maintaining the battery in a fully charged state when the main power supply is operating.

An operator can communicate with the DAS 20 by means of a keyboard 62. The keyboard 62 is connected to a parallel input/output (I/O) circuit 64 which supplies inputs to the MPU 50 through the backplane 52. The keyboard is also connected directly to the MPU 50 to signal the MPU when the keyboard is in operation. The operator uses the keyboard to supply specific instructions to the MPU 50, as well as for entering constants of the system to be used in the calculations.

The data and the calculations compiled by the MPU 50 can be transmitted to a video monitor driver 66 and a video memory 68. Since very high speed is required in the communications between the driver 66 and the memory 68, the two units are connected directly together so that they can communicate without using the backplane 52. The driver 66 is also connected for direct communication with the parallel I/O circuit 64. The driver 66 produces a composite video signal which is supplied to a cathode ray tube (CRT) monitor 70. The monitor 70 then displays the information for visual inspection by the operator. The keyboard 62 enables the operator to select the specific data which is to be displayed.

In addition to visually displaying the data and the calculations, the DAS 20 transmits this information to the record/print system 24 where the information can be stored on a magnetic tape and a print-out is produced for the operator. The information is supplied to the record/print system 24 through a serial/parallel I/O circuit 72 and a fiber-optic modem 74. The I/O circuit 72 transmists data received from the MPU 50 on the backplane 52 to the modem 74 on lines 76. The modem 74 converts the electrical data on the lines 76 into optical data and then sends the transformed data to the record/print system 24 on the fiber-optic lines 22. As will be discussed, the record/print system includes a modem for converting the optical data back to electrical data for the recorder and printer.

The main reason for transmitting data in optical form between the DAS 20 and the record/print system 24 is the safety aspects of the system which must be considered when operating electronic equipment in the vicinity of flammable materials. Typically, the DAS 20 and the record/print system 24 will be housed in separate cabinets, and thus the lines 22 will be exposed. Transmitting the data on the lines 22 in optical form increases the safety of the system. If the DAS 20 and the record/print system 24 were housed in a single cabinet, or the system 10 was sufficiently isolated from the flammable materials, the fiber-optic modems could be eliminated and the information could be transmitted between the DAS 20 and the system 24 in electrical form.

In addition to outputting data to the record/print system 24, the I/O circuit 72 is also utilized to receive incomming data. The circuit 72 is connected to receive the real time signal on the lines 32 from the clock circuit 30. The I/O circuit 72 also includes individual counters which are utilized to count a pulsed transducer output signal on a line 18b (one of the lines 18). Several of the transducers generate a pulse train as an output signal, while other transducers generate an analog output signal.

The DAS 20 includes an A/D converter 77 connected to a line 18a (one of the lines 18) to receive data from a transducer having an analog output signal. The A/D converter also receives a signal on a line 28a (one of the lines 28) representing the system AC voltage level, and another signal on a line 78 representing the transducer DC voltage level.

All of the components of the data acquisition system 20 shown in block diagram form in FIG. 2a can be commerically available components. The following table (Table 2) is a list of the DAS 20 components, along with the model number and manufacturer of each component, which may be utilized.

TABLE 2

COMPONENTS OF DATA ACQUISITION SYSTEM

| Component | Model Number (Manufacturer) |
|---|---|
| (1) MPU 50 | Module 1015 (Adaptive Science Corporation, 4700 San Pablo Avenue, Emeryville, California 94608) |
| (2) Backplane 52 | Module 1912 (Adaptive Science Corp.) |
| (3) EPROMs 54 and 58 | Module 1400 (Adaptive Science Corp.) |
| (4) APU 58 | Module 1200 (Adaptive Science Corp.) |
| (5) CMOS RAM 60 | Module 1520 (Adaptive Science Corp.) |
| (6) Keyboard 62 | IEE thinswitch No. 2500-02 |
| (7) Parallel input/output 64 | Module 1300 (Adaptive Science Corp.) |
| (8) Video monitor driver 66 | Module 1700 (Adaptive Science Corp.) |
| (9) Video memory 68 | Module 1701 (Adaptive Science Corp.) |
| (10) CRT Monitor 70 | |
| (11) Serial/parallel I/O with counters 72 | Module 1140 (Adaptive Science Corp.) |
| (12) Fiber-optic modem 74 | Canoga Data Systems Model CRS-100-S |
| (13) A/D converter 77 | Module 1642 (Adaptive Science Corp.) |

Figure 2B:
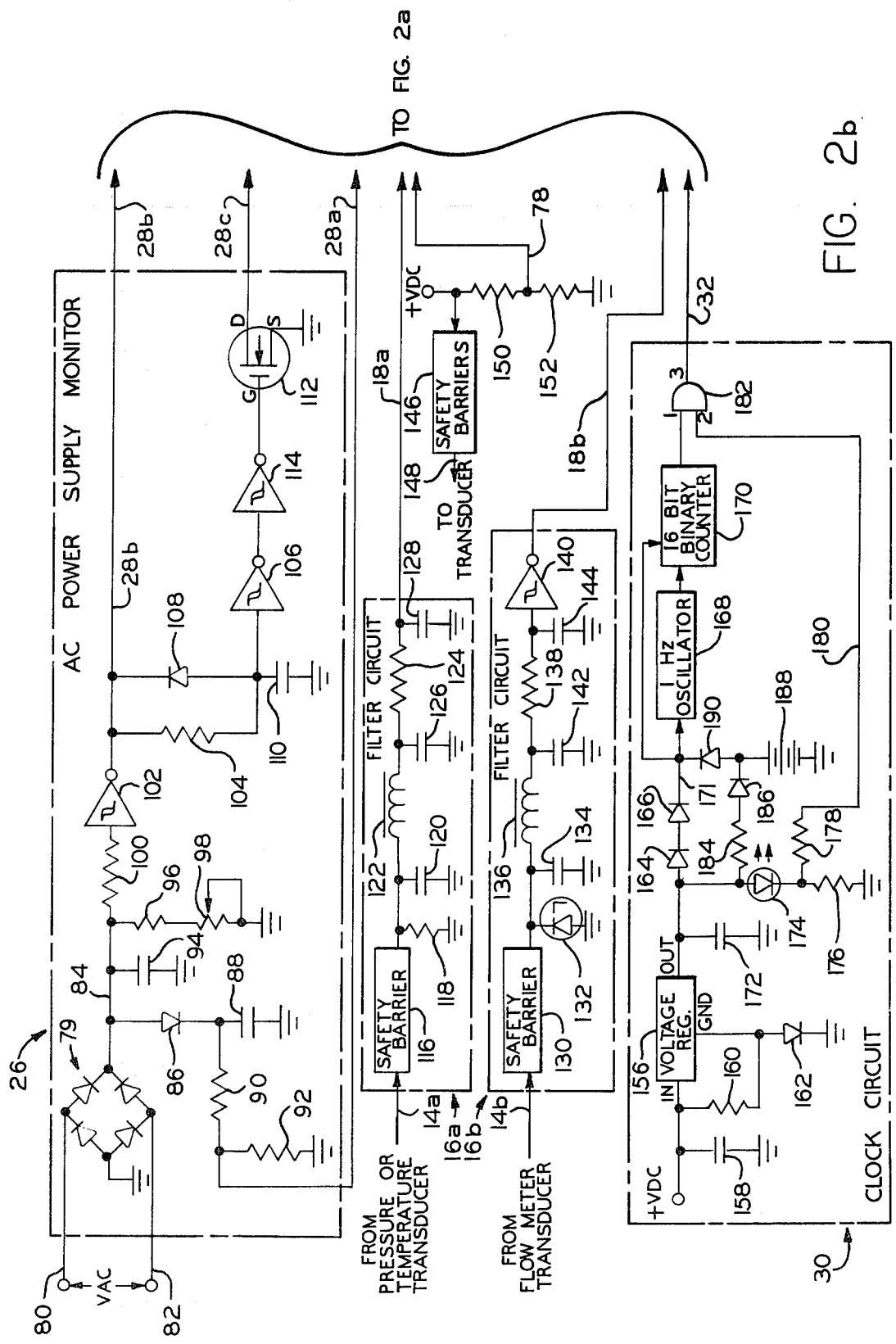
FIG. 2b is a partial block diagram, partial schematic of the power supply monitor, the clock circuit, and the filter circuits of FIG. 1.

There is shown in FIG. 2b a circuit schematic of the AC power supply monitor 26, the filter circuits 16, and the clock circuit 30. The AC power supply monitor 26 includes a full wave bridge rectifier 79 constructed of four diodes connected to receive a VAC alternating voltage signal generated across lines 80 and 82. The VAC voltage signal is typically a lower tap output of the main power transformer having a voltage level directly proportional to the voltage level of the main power signal. The rectifier 79 converts the AC signal across the lines 80 and 82 into a DC signal on a line 84 having a voltage level directly proportional to the AC signal level.

The line 84 is connected to the anode of a diode 86 having a cathode connected to the ground potential through a capacitor 88. A pair of resistors 90 and 92 are connected between the cathode of the diode 86 and the ground potential. The junction between the resistors 90 and 92 is connected to the line 28a which is connected to the A/D converter 77.

A capacitor 94 is connected between the line 84 and the ground potential. A resistor 96 and a potentiometer 98 are connected in series between the line 84 and the ground potential The potentiometer 98 has a variable terminal connected to the ground potential.

The signal on the line 84 is supplied through a resistor 100 as an input to a Schmitt trigger 102 having an output connected to a line 28b (one of the lines 28 of FIG. 1). The output of the trigger 102 is also supplied through a resistor 104 as an input to a Schmitt trigger 106. A diode 108 has an anode connected to the input of the trigger 106 and a cathode connected to the line 28b. A capacitor 110 is connected between the input of the trigger 106 and the ground potential.

The Schmitt trigger 106 generates an output signal which is supplied to the gate of a MOSFET transistor 112 through another Schmitt trigger 114. The transistor 112 has a drain connected to a line 28c (one of the lines 28 of FIG. 1), and a source connected to the ground potential.

The monitor 26 generates three separate signals to the data acquisition system 20, a MPU power failure warning signal on the line 28b, a memory shut off signal on the line 28c, and an AC level signal on the line 28a.

When the power is present on the lines 80 and 82, the AC signal on the lines 84 is supplied through the diode 86 to charge the capacitor 80 to a DC level directly proportional to the level of the monitored AC signal. This DC signal is supplied through the resistor 90 to the A/D converter 77 on the line 28a. The MPU 50 can then monitor the VAC signal level to check whether the signal level is within predetermined acceptable limits. If the VAC signal should fall outside the accepted range, the MPU 50 can signal the operator that certain data was obtained when the VAC signal level was outside the limits and therefore, this data may not be valid.

The DC signal on the line 84 is also used to charge the capacitor 94, which is typically of a lower value than the capacitor 88. As long as the level of the signal on the line 84 remains above the lower trigger level of the Schmitt trigger 102, the trigger will generate a logic "0" near ground potential on the line 28b to signal the MPU 50 that the power supply is operating. The logic "0" signal on the line 28b is also supplied through the resistor 104 to the Schmitt trigger 106. The trigger 106 generates a logic "1" signal which causes the Schmitt trigger 114 to generate a logic "0". The logic "0" signal at the gate of the transistor 112 maintains the transistor 112 in an off condition such that the signal on the line 28c remains at the high logic level. When the signal on the line 28c is at the high level, the CMOS RAM 60 can be accessed by the MPU 50.

When the VAC signal fails, the capacitor 94 will discharge through the resistor 96 and the potentiometer 98. The discharge rate of the capacitor is determined by the component values of the capacitor 94 and the resistor 96, and the effective resistance of the potentiometer 98. When the signal on the line 84 falls below the lower trigger level, the output of the trigger 102 changes from logic "0" to logic "1" to signal the MPU 50 of the power failure. The MPU 50 will then take all the outstanding pertinent data and store that data in the CMOS RAM 60.

The logic "1" signal on the line 28b is also supplied through the resistor 104 to charge the capacitor 110. When the capacitor 110 has charged to a higher trigger level of the trigger 106, the trigger will generate a logic "0" signal which causes the trigger 114 to generate a logic "1" signal to turn on the transistor 112. This pulls the line 28c to near ground potential, which is logic "0".

A logic "0" on the line 28c prevents access to the RAM 60 by the MPU 50, and thus projects the memory until the power is restored.

When the AC power is restored, the capacitor 94 is recharged to trigger the output of the trigger 102 to a logic "0". This causes the capacitor 110 to discharge through the diode 108 and the Schmitt triggers 106 and 114 turn off the transistor 112. Thus, the lines 28b and 28c will return to logic "0" and "1" respectively, indicating that the power supply is operating.

As previously mentioned, the transducer output signals are supplied to filter circuits before they are sent to the data acquisition system 20. It should be noted that the transducers can generate different types of output signals representing the measured parameter. For example, the pressure and temperature transducers listed in TABLE 1 each generate an output signal having a DC current level directly porportional to the measured parameter. On the other hand, the flow meter transducers of TABLE 1 generate a pulsed output signal, with each pulse representing a predetermined amount of fluid flow. FIG. 2b shows two different filter circuits, a filter circuit 16a which receives a direct current signal on a line 14a (one of the lines 14) from either a pressure or temperature transducer, and a filter circuit 16b which receives a pulsed signal on a line 14b (one of the lines 14) from a flow meter transducer. It should be noted that, although only two filter circuits shown in FIG. 2b, the system 10 typically includes a separate filter circuit for each transducer. The particular type of filter circuit used is dependent on the type of output signal generated by the associated transducer.

The filter circuit 16a includes a safety barrier 116 which is connected to receive a transducer output signal on the line 14a. The safety barrier 116 permits passage of a desired signal or current, but restricts current flow under fault conditions to a safe level. This prevents sparking in the potentially dangerous area.

A resistor 118 and a capacitor 120 are connected in parallel between the output of the barrier 116 and the ground potential. An inductor 122 and a resistor 124 are connected in series between the output of the safety barrier 116 and the line 18a (one of the lines 18). A capacitor 126 is connected between the junction of the inductor 122 and the resistor 124 and the ground potential. Another capacitor 128 is connected between the line 18a and the ground potential.

The resistor 118 is typically a precision resistor such that the voltage level at the output of the barrier 116 is a DC level directly proportional to the value of the measured characteristic. The inductor 122, the resistor 124, and the capacitors 120, 126, and 128 constitute a low pass filter which eliminates noise on the line 14a before generating the filtered output signal on the line 18a. The MPU 50 will then periodically read each transducer signal supplied to the A/D converter 77.

The filter circuit 16b receives a pulsed transducer output signal on the line 14b (one of the lines 14) which is connected to the input of the barrier 130. The output of the barrier 130 is connected to the cathode of a zener diode 132 having an anode connected to the ground potential. A capacitor 134 is connected between the output of the barrier 130 and the ground potential. An inductor 136 and a resistor 138 are connected in series between the barrier output and the input of a Schmitt trigger 140. A capacitor 142 is connected between the junction of the inductor 136 and the resistor 138 and the ground potential. Another capacitor 144 is connected between the input of the trigger 140 and the ground potential. The output of the trigger 140 is connected to line 18b, which is one of the lines 18 of FIG. 1. The line 18b is connected to the I/O circuit 72.

The zener diode 132 functions to clamp the amplitude of the output of the barrier 130 in the event the input signal exceeds the normal input voltage allowed by the Schmitt trigger 140. The inductor 136, the resistor 138, and the capacitors 134, 142, and 144 constitute a low pass filter to reduce noise in the signal before it is supplied as an input to the Schmitt trigger 140. Each time a pulse is received by the filter circuit 16b, the trigger 140 will generate an output pulse on the line 18b to increment one of the counters in the circuit 72. The MPU 50 will then read the counter periodically to determine the total volume of flow. Since the MPU also receives a real time signal from the clock circuit 30, the MPU can also calculate the flow rate of the fluid sensed by the respective transducers.

Typically, the transducers are connected to receive a power supply signal. In FIG. 2b, a VDC power supply (not shown) generates a +VDC signal through safety barriers 146 on a line 148 to the transducers. A voltage divider consisting of serially connected resistors 150 and 152 is connected between the VDC power supply and the ground potential. The line 78 is connected between the resistors 150 and 152 to generate a reduced voltage level signal to the A/D converter 77. The MPU 50 can then monitor the performance of the VDC power supply to ensure that the voltage does not exceed the voltage limits of the safety barriers 146 and that adequate voltage is supplied to the transducers. If excessive power source fluctuation occurs, the MPU 50 generates a power fluctuation signal to the video monitor driver 66 for display on the CRT monitor 70 and to the record/print system 24 for recording on a tape with the other data.

As previously mentioned, the clock circuit 30 generates a real time signal on the line 32 to the MPU 50 through the I/O circuit 72. The clock circuit 30 includes a voltage regulator 156 having an input connected to the VDC power supply. A filter capacitor 158 is connected between the regulator input and the ground potential. A resistor 160 is connected between the regulator input and a ground input of the regulator. A diode 162 has an anode connected to the ground input of the regulator and a cathode connected to the ground potential.

The output of the voltage regulator 156 is supplied through a pair of diodes 164 and 166 to provide power to a one Hz oscillator 168 and a sixteen bit binary counter 170 on a line 171. The oscillator increments the counter 170 once each second to produce a count representing the real time. A filter capacitor 172 is connected between the output of the regulator 156 and the ground potential.

The output of the regulator 156 is also connected to the anode of a light emitting diode (LED) 174 having a cathode connected to the ground potential through a resistor 176. A resistor 178 is connected between the cathode of the LED 174 and a line 180 which is connected to an input 182-2 of an AND gate 182. The AND gate 182 has a second input 182-1 connected to one of the sixteen output lines of the counter 170. The AND gate 182 is representative of sixteen such AND gates each having one input connected to receive a separate one of the counter output signals, and a second input connected to receive the signal on the line 180. The AND gate 182 has an output 182-3 connected to one of the lines 32 to supply the counter output to the I/O circuit 72.

A resistor 184 is connected between the output of the regulator 156 and the anode of a diode 186 having a cathode connected to the positive terminal of a DC backup battery 188. The negative terminal of the battery 188 is connected to the ground potential. A diode 190 has an anode connected to the positive terminal of the battery 188 and a cathode connected to the line 171.

When the voltage regulator 156 is operating properly, a positive DC voltage signal is generated at its output to forward bias the diodes 164 and 166 and apply a DC signal on the line 171 to the oscillator 168 and the counter 170. The oscillator 168 generates an output pulse each second to increment the counter 170. The DC voltage signal generated by the regulator 156 is supplied to light the LED 174 to indicate that the regulator is operating properly. When the LED 174 is on, the cathode of the LED 174 will be near the DC voltage signal level. This high level signal is supplied through the resistor 178 as a logic "1" signal to the input 182-2 of the AND gate 182. This enables the AND gate 182 to supply the counter output of the I/O circuit 72. The regulator 156 maintains the battery 188 in a fully charged state by supplying a charge current through the resistor 184 and the diode 186.

In the event the VDC power supply is interrupted, the DC voltage signal at the output of the regulator 156 will drop and the diodes 164 and 166 will become reverse biased. The diode 190 is then forward biased such that the backup battery 188 supplies a DC voltage signal on the line 171 to power the oscillator 168 and the counter 170. Also, when the regulator voltage drops, the LED 174 will turn off such that its cathode will be at ground potential. This ground signal is supplied through the resistor 178 as a logic "0" to the AND gate input 182-2. This disables the AND gate and prevents the counter output signal from being supplied to the I/O circuit 72 when the VDC power supply is down. Thus, in the event of a power failure, the counter 170 will maintain a real-time count such that when power is restored, the system will recognize that a power interrupt has occured. The operator can then input data to the system so that a maximum of continuity can be realized in operating the system.

Figure 3:
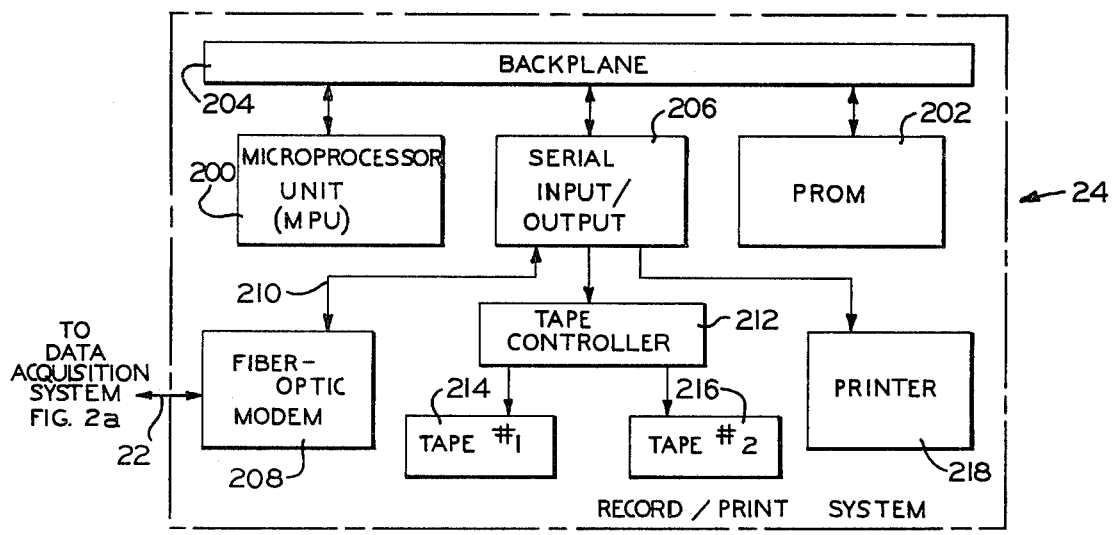
FIG. 3 is a block diagram of the record/print system of FIG. 1.

There is shown in FIG. 3, a simplified block diagram of the record/print system 24. The controller of the system 24 is an MPU 200 connected to receive operating instructions from a PROM 202 through a backplane 204. The MPU 200 transmits and receives data from the other components of the system 24 through a serial input/output circuit 206. The backplane provides the connections between the MPU 200, the I/O circuit 206, and the PROM 202 required to carry the control signals, the address and data busses, and the power and ground lines.

The system 24 also includes a fiber-optic modem 208 for receiving data in optical form from the DAS 20 on the fiber-optic lines 22. The modem 208 converts the optical data on the lines 22 into an electrical form and then sends the transformed data to the I/O circuit 206 on lines 210. The MPU 200 receives this data via the backplane 204.

The MPU 200 outputs data received from the DAS 20 through the I/O circuit 206 to a tape controller 212. The controller 212 then records the data on a magnetic tape #1 214. After the tape #1 becomes full, the system will automatically switch to recording the data on a tape #2 216. The tapes 214 and 216 can be changed periodically to provide additional storage. The MPU 200 also includes RAM temporary storage for data.

The MPU 200 also transmits data received from the DAS 20 through the I/O circuit 206 to a printer 218. The printer 218 provides a printout which then can be examined by the operator. Typically, the operator will not want all the data received from the DAS 20 to be printed by the printer. The keyboard 62 of the DAS 20 (FIG. 2a) allows the operator to select the specific data and time intervals for printing. These instructions can then be supplied to the MPU 200 via the lines 22.

All of the components of the record/print system 24 shown in block diagram form in FIG. 3 can be commercially available components.

The following table (Table 3) is a list of the record/print system 24 components, along with the model number and manufacturer of each component, which can be utilized.

TABLE 3

| COMPONENTS OF THE RECORD/PRINT SYSTEM | |
|---|---|
| Component | Model Number (Manufacturer) |
| (1) MPU 200 | Module 1015 (Adaptive Science Corporation) |
| (2) PROM 202 | Module 1416 (Adaptive Science Corp.) |
| (3) Backplane 204 | Module 1904 (Adaptive Science Corp.) |
| (4) Serial input/ output circuit 206 | Module 1180 (Adaptive Science Corp.) |
| (5) Fiber-optic modem 208 | |
| (6) Tape controller 212 | TU-58 Recorder (Digital Equipment Corporation) |
| (7) Printer 218 | Model 743 Electronic Data Terminal (Texas Instruments Incorporated, P.O. Box 1444, Houston, Texas 77001) |

Figure 4:
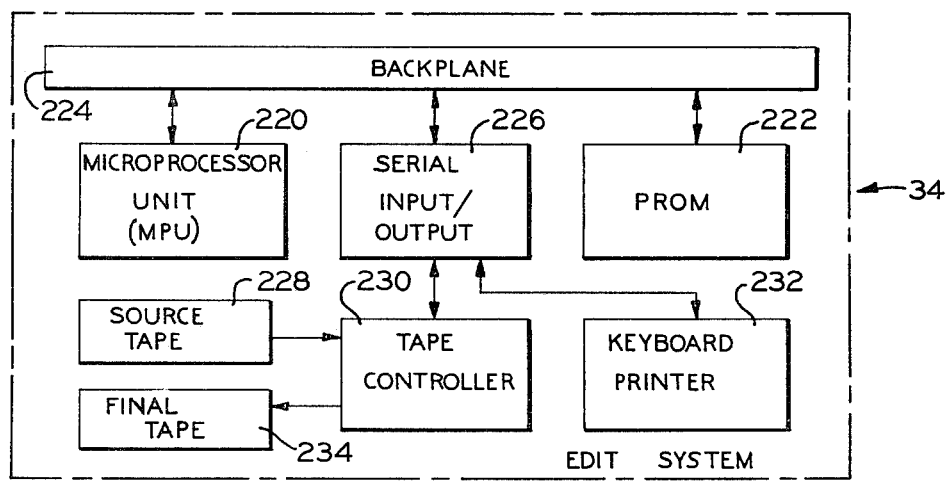
FIG. 4 is a block diagram of the edit system of FIG. 1.

There is shown in FIG. 4 a simplified block diagram of the edit system 34. After a tape has been recorded with data in the record/print system, the record tape is transferred to the edit system where the recorded data can be examined by the operator. The operator can then delete any unnecessary data and add data and comments. A new tape with the revised data can then be produced.

The controller of the edit system 34 is an MPU 220 connected to receive operating instructions from a PROM 222 through a backplane 224. The MPU 220 transmits and receives data from the other components of the system 34 through a serial input/output circuit 226. The backplane 224 provides the connections between the MPU 220, the I/O circuit 226, and the PROM 222 required to carry the control signals, the address and data busses, and the power and ground lines.

The MPU 220 will read a source tape 228 through the I/O circuit by means of a tape controller 230. The source tape 228 is one of the magnetic tapes 214 or 216 (FIG. 3) which has been recorded with data by the record/print system. The data read from the source tape 228 by the MPU 220 is then transmitted to a keyboard/printer unit 232 where the data is printed for examination by the operator. The operator can then use the keyboard of the unit 232 to instruct the MPU 220 to delete unnecessary data and/or add data. The operator can also add comments to the remaining data. The MPU 220 will then transmit the revised data to the tape controller 230. The controller 230 then records the revised data on a final tape 234 and the original or source tape is left intact.

All of the components of the edit system 34 shown in block diagram form in FIG. 4 can be commercially available components. The following table (Table 4) is a list of the edit system 34 components, along with the model number and manufacturer of each component, which can be utilized.

TABLE 4
COMPONENTS OF THE EDIT SYSTEM

| Component | Model Number (Manufacturer) |
|---|---|
| (1) MPU 220 | Module 1015 (Adaptive Science Corporation) |
| (2) PROM 222 | Module 1416 (Adaptive Science Corp.) |
| (3) Backplane 224 | Module 1904 (Adaptive Science Corp.) |
| (4) Serial input/ output circuit 226 | Module 1120 (Adaptive Science Corp.) |
| (5) Tape controller 230 | TU-58 Recorder (Digital Equipment Corporation) |
| (6) Keyboard/printer unit 232 | Model 745 Electronic Data Terminal (Texas Instruments Incorporated) |

In summary, the present invention concerns an apparatus in the testing of a subterranean well. A plurality of surface and downhole transducers are utilized to generate signals representing operating characteristics of the well. The apparatus includes means connected to the transducers for periodically storing values of the transducer signals, means for reading at least one of the stored values to generate a value for an additional operating characteristic of the well, and means for generating a plurality of output signals representing the stored values and the additional operating characteristic value. The means for storing can include a random access memory, the means for reading can include a microprocessor unit and an arithmetic processing unit, and the means for generating can include the microprocessor unit and an output circuit. The microprocessor unit, the random access memory, the arithmetic processing unit, and the output circuit can all be connected to a backplane for intercommunication.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An apparatus for compiling and monitoring data during the testing of a subterranean well having a plurality of transducers for generating signals representing production characteristics of the well, including at least one transducer positioned at the surface of the well for generating a surface production characteristic signal representing at least one of wellhead pressure, wellhead temperature, gas temperature, oil temperature, gas differential pressure, static separator pressure, oil flow and water flow, comprising: means connected to the transducers for periodically storing values of the transducer signals; means connected to said means for storing for reading said stored value of said one surface transducer signal to generate a value for an additional operating characteristic of the well; means connected to said means for storing and said means for generating said additional operating characteristic value for generating a plurality of output signals representing said stored values and said additional operating characteristic value; a power supply connected to power the transducers; means connected to said power supply for generating a voltage level signal representing the magnitude of the power supply output voltage; and means for comparing said voltage level signal with predetermined upper and lower voltage limits to generate a power fluctuation signal when said voltage level signal is outside said voltage limits.

2. The apparatus according to claim 1 including filter means connected between the transducers and said means for storing for filtering electrical noise from the transducer signals.

3. The apparatus according to claim 1 including means responsive to said power fluctuation signal for generating a power fluctuation output signal representing the value of the power supply fluctuation.

4. The apparatus according to claim 1 or 3 including means responsive to said output signals for visually displaying the values of said output signals.

5. The apparatus according to claim 1 including a primary power supply connected to said means for storing, a backup power supply, and means connected to said primary power supply for connecting said backup power supply to said means for storing when the magnitude of the primary power supply output voltage drops below a predetermined value whereby said means for storing continues to store said transducer signal values during a failure of said primary power supply.

6. The apparatus according to claim 5 wherein said means for connecting includes means connected to said primary power supply for generating a power failure warning signal in response to a primary power supply output voltage drop below said predetermined value, means responsive to said power failure warning signal for generating a control signal after a predetermined time, and means responsive to said control signal for connecting said means for storing to said backup power supply.

7. The apparatus according to claim 1 including means connected to said means for generating said output signals for recording the values of said output signals on a record medium.

8. The apparatus according to claim 7 wherein said means for recording includes a magnetic tape recorder means for recording the values of said output signals on magnetic tape.

9. The apparatus according to claim 7 wherein said means for recording includes a printer means for recording the values of said output signals on paper.

10. The apparatus according to claim 1 wherein at least another one of the transducers is positioned downhole and wherein said means for generating said additional operating characteristic value reads said stored value of said one downhole transducer signal to generate a value for a second additional operating characteristic of the oil well and said means for generating said output signals generates an output signal representing said second additional operating characteristic value.

11. An apparatus for compiling and monitoring data during testing of a subterranean well connected to a production test system having a plurality of transducers for generating signals representing operational characteristics of the well, including at least one transducer positioned at the surface of the well for generating a surface operational characteristic signal representing at least one of wellhead pressure, wellhead temperature, gas temperature, oil temperature, gas differential pressure, static separator pressure, oil flow and water flow, comprising: means for storing values of the transducer signals; means for periodically reading the values of the transducer signals into said means for storing; means for reading said stored value of said one surface transducer signal to generate a value for an additional operating characteristic of the well; means for generating a plurality of output signals representing said stored values and said additional operating characteristic value; means for interconnecting the transducers of the production test system, said means for storing, said means for reading, said means for generating said additional operating characteristic value, and said means for generating output signals for intercommunication; a power supply connected to power the transducers, means connected to said power supply for generating a voltage level signal representing the magnitude of the power supply output voltage, and means for comparing said voltage level signal with predetermined upper and lower voltage limits to generate a power fluctuation signal when said voltage level signal is outside said voltage limits.

12. The apparatus according to claim 11 including means responsive to said power fluctuation signal for visually displaying the value of the fluctuation of the power supply output voltage from said predetermined limits.

13. The apparatus according to claim 11 including means for recording the value of said power fluctuation signal on a record medium.

14. The apparatus according to claim 11 including means responsive to said output signals for visually displaying the values of said output signals.

15. The apparatus according to claim 11 including means for recording the values of said output signals on a record medium.

16. The apparatus according to claim 11 including a primary power supply connected to power said means for storing; a backup power supply; and means responsive to the magnitude of the output voltage of said primary power supply for connecting said backup power supply to said means for storing when the magnitude of the output voltage of said primary power supply falls below a predetermined value.

17. The apparatus according to claim 16 wherein said means for connecting includes means for comparing the primary power supply output voltage magnitude with said predetermined value and for generating a power failure warning signal when the magnitude falls below said predetermined value, means responsive to said power failure warning signal for generating a control signal after a predetermined time, and means responsive to said control signal for connecting said means for storing to said backup power supply.

18. An apparatus for compiling and monitoring data during the testing of a subterranean well connected to a production system having a plurality of transducers for generating signals representing operational characteristics of the well, including at least one transducer positioned at the surface of the well for generating a surface operational characteristic signal representing at least one of wellhead pressure, wellhead temperature, gas temperature, oil temperature, gas differential pressure, static separator pressure, oil flow and water flow, comprising: means for storing current values of the transducer signals; means for periodically reading the current values of the transducer signals into said storage means to replace previously stored current values; means for reading said stored current value of said one surface transducer signal from said means for storing to generate a value for an additional operating characteristic of the well; means for generating a plurality of output signals representing said stored values and said additional operating characteristic value; means for interconnecting the transducers of the production system, said means for storing, said means for periodically reading, said means for reading at least one of the stored current values, and said means for generating said output signals for intercommunication; a power supply connected to power the transducers, means connected to said power supply for generating a voltage level signal representing the magnitude of the power supply output voltage, and means for comparing said voltage level signal with predetermined upper and lower voltage limits to generate a power fluctuation signal when said voltage level signal is outside said voltage limits.

19. The apparatus according to claim 18 wherein said means for reading said one stored current value periodically reads each new current value of said one stored current value to generate a new value for said additional operating characteristic.

20. The apparatus according to claim 18 including means responsive to said output signals for visually displaying the values of said output signals.

21. The apparatus according to claim 20 wherein said means for visually displaying periodically displays the values of said output signals for periods of greater time duration than the reading periods of said means for periodically reading.

22. The apparatus according to claim 18 including means responsive to said output signals for recording the values of said output signals on a record medium.

23. The apparatus according to claim 22 wherein said means for recording includes a magnetic tape recorder for recording the values of said output signals on magnetic tape.

24. The apparatus according to claim 23 wherein said means for recording periodically records the values of said output signals at the same frequency as said means for periodically reading reads the current values of the transducer signals.

25. The apparatus according to claim 22 wherein said means for recording includes a printer means for recording the values of said output signals on paper.

26. The apparatus according to claim 25 wherein said means for recording periodically records the values of said output signals for periods of greater time duration than the reading periods of said means for periodically reading.

27. The apparatus according to claim 18 wherein at least one of the transducers is positioned downhole.

28. The apparatus according to claim 18 including means responsive to said output signals for recording the values of said output signals on a first magnetic tape, means for reading said first magnetic tape and storing the values, means for changing at least one of said first magnetic tape stored values, and means for recording said changed value and the remainder of said first magnetic tape stored values on a second magnetic tape.

* * * * *